United States Patent [19]

Schappler et al.

[11] Patent Number: 5,177,517
[45] Date of Patent: Jan. 5, 1993

[54] PHOTOGRAPHIC CAMERA WITH INTEGRAL HANDLE

[75] Inventors: Joseph J. Schappler, Bedford, N.H.; Darren M. Gilford, Pasadena, Calif.

[73] Assignee: Eastman Kodak Company, Rochester, N.Y.

[21] Appl. No.: 722,578

[22] Filed: Jun. 24, 1991

[51] Int. Cl.⁵ .............................. G03B 29/00
[52] U.S. Cl. ............................................ 354/82
[58] Field of Search ............... 354/75, 76, 81, 82, 354/293; 352/243; 358/229

[56] References Cited

U.S. PATENT DOCUMENTS 3,263,588  8/1966  Robinson .................. 354/76 X
4,819,016  4/1989  Leonard et al. ............ 354/82

Primary Examiner—Richard A. Wintercorn
Assistant Examiner—Howard B. Blankenship
Attorney, Agent, or Firm—Roger A. Fields

[57] ABSTRACT

A phtographic camera includes a handle mounted for swinging movement equally in opposite directions from a center position to right-hand and left-hand positions to permit similar right-hand and left-hand use of the handle. The camera body has an integral wrist rest which serves as an alternative right-hand/left-hand support for one's wrist when the handle is in its right-hand position or its left-hand position. An objective lens is mounted on a forward end portion of the wrist rest.

5 Claims, 5 Drawing Sheets

PHOTOGRAPHIC CAMERA WITH INTEGRAL HANDLE

BACKGROUND OF THE INVENTION

1. Field of the Invention

The invention relates generally to the field of photographic cameras, and particularly to right-hand/left-hand handle or grip.

2. Description of the Prior Art

No matter how good a camera may be or how accurately it has been made, it cannot yield really acceptable results if it moves during the exposure. Much of the poor definition obtained by amateur and professional photographers is caused by a slight movement of the camera during the time the shutter is open. Thus, it is well known to provide a camera with a handgrip that is grasped in order to hold the camera steady.

Typically, the arrangement of a handgrip on a camera does not lend itself to alternative right-hand/left-hand use, and instead favors only right-hand use. One solution to the problem is suggested in commonly assigned U.S. Pat. No. 4,819,016, issued Apr. 4, 1989. The patent discloses a camera having a removable web-handle that can be connected selectively to either one of two opposite sides of the camera body to permit right-hand or left-hand use of the handle.

SUMMARY OF THE INVENTION

According to the invention, there has been devised a photographic camera having a handle mounted for swinging movement equally in opposite directions form a center position to right-hand and left-hand positions to permit similar right-hand and left-hand use of the handle. Preferably, the camera body has an integral wrist rest which serves as an alternative right-hand/left-hand support for one's wrist when the handle is in its right-hand position or its left-hand position. An objective lens is mounted on a forward end portion of the wrist rest.

DETAILED DESCRIPTION OF THE PREFERRED EMBODIMENT

The invention is disclosed as being embodied preferably in a photographic camera. Because the features of this camera are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
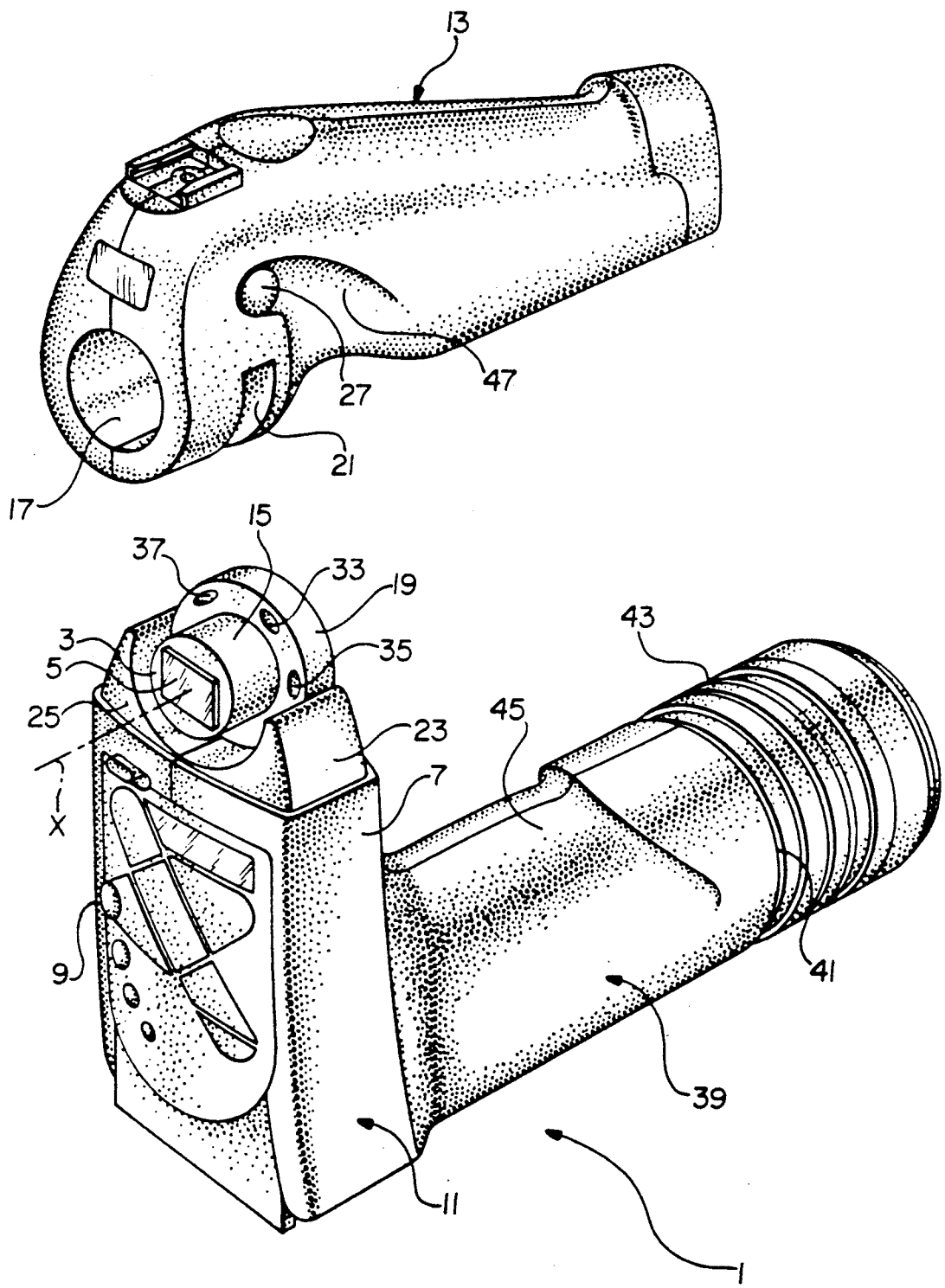
FIG. 1 is an exploded rear perspective view of a photographic camera according to a preferred embodiment of the invention.

Referring now to the drawings, FIG. 1 shows a photographic camera 1 wherein a through-the-lens or other known type viewfinder 3 has a viewing axis X extending rearwardly from a rear finder window 5. The rear finder window 5 is located midway between two opposite sides 7 and 9 of a camera body 11. A handle 13 is provided for manually holding the camera body 11 steady during picture-taking.

Figure 4:
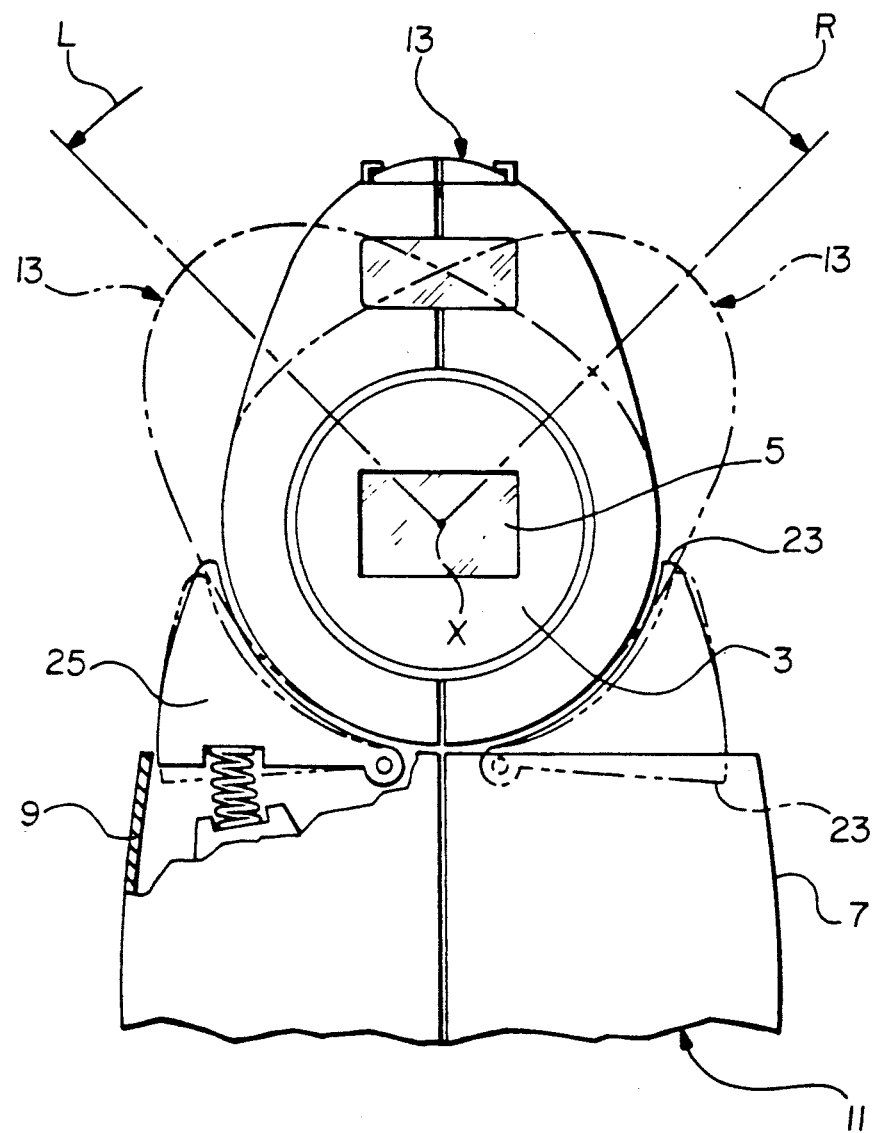
FIG. 4 is a rear elevational view of the camera, showing the handle in its center position in solid lines and in its right-hand and left-hand positions in broken lines.

As can be appreciated by viewing FIG. 1, a first support portion 15 of the camera body 11 resides in a first opening 17 in the handle 13, and a second support portion 19 of the camera body resides in a second opening 21 in the handle. This arrangement permits the handle 13 to be manually swung about the viewing axis X in opposite directions L and R from a center position shown in solid lines in FIG. 4, directly above the viewing axis X, generally towards the opposite sides 7 and 9 of the camera body 11 to right-hand and left-hand positions shown in broken lines in FIG. 4. Respective stop blocks 23 and 25, each spring-urged outwardly of the camera body 11 and pivotally connected to the camera body as shown in FIG. 4, limit movement of the handle 13 equally (e.g. 45°) in the opposite directions L and R from the center position to the right-hand and left-hand positions.

Figure 2:
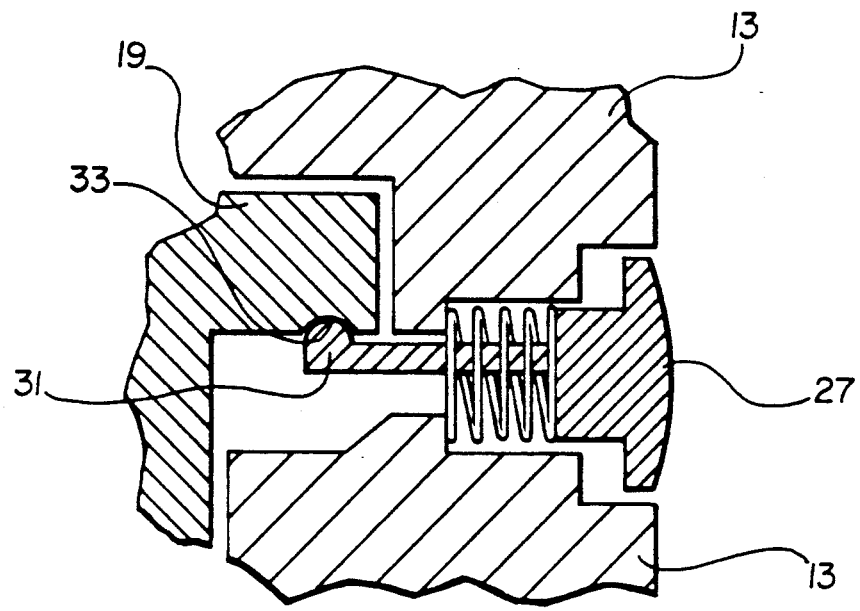
FIG. 2 is a sectional view of a locking mechanism for releasably locking a handle of the camera in a right-hand position, a center position and a left-hand position, showing the locking mechanism in a locking state.
Figure 3:
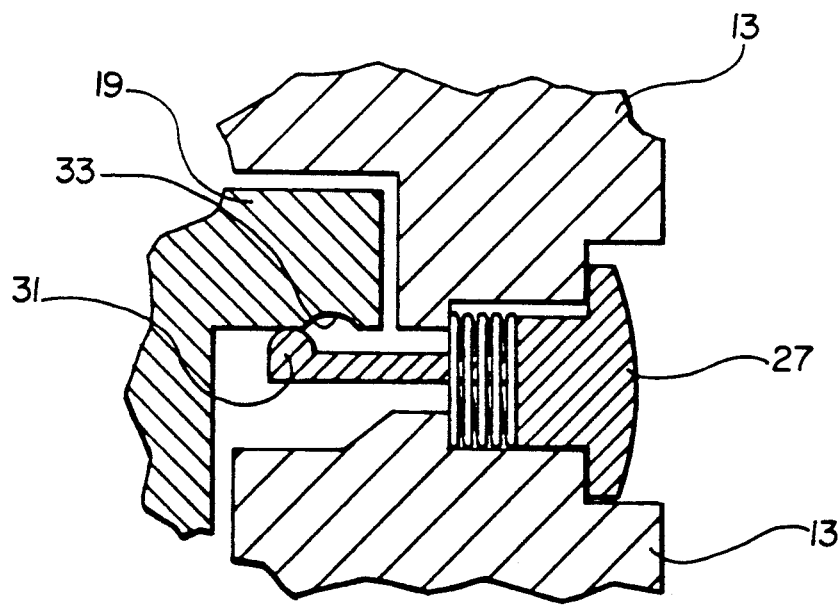
FIG. 3 is a sectional view similar to FIG. 2, showing the locking mechanism in an unlocking state.

A locking button 27 located on the handle 13 includes a locking tip 31 that can fit within any one of three locking cavities 33, 35 and 37 in the second support portion 19 of the camera body 11 to releasably lock the handle in its center, right-hand and left-hand positions. See FIGS. 1–3. The locking button 27 is manually depressible against the urging of a return spring to remove the locking tip 31 from any one of the locking cavities 33, 35 and 37 to permit the handle 11 to be manually swung about the viewing axis X.

Figure 5:
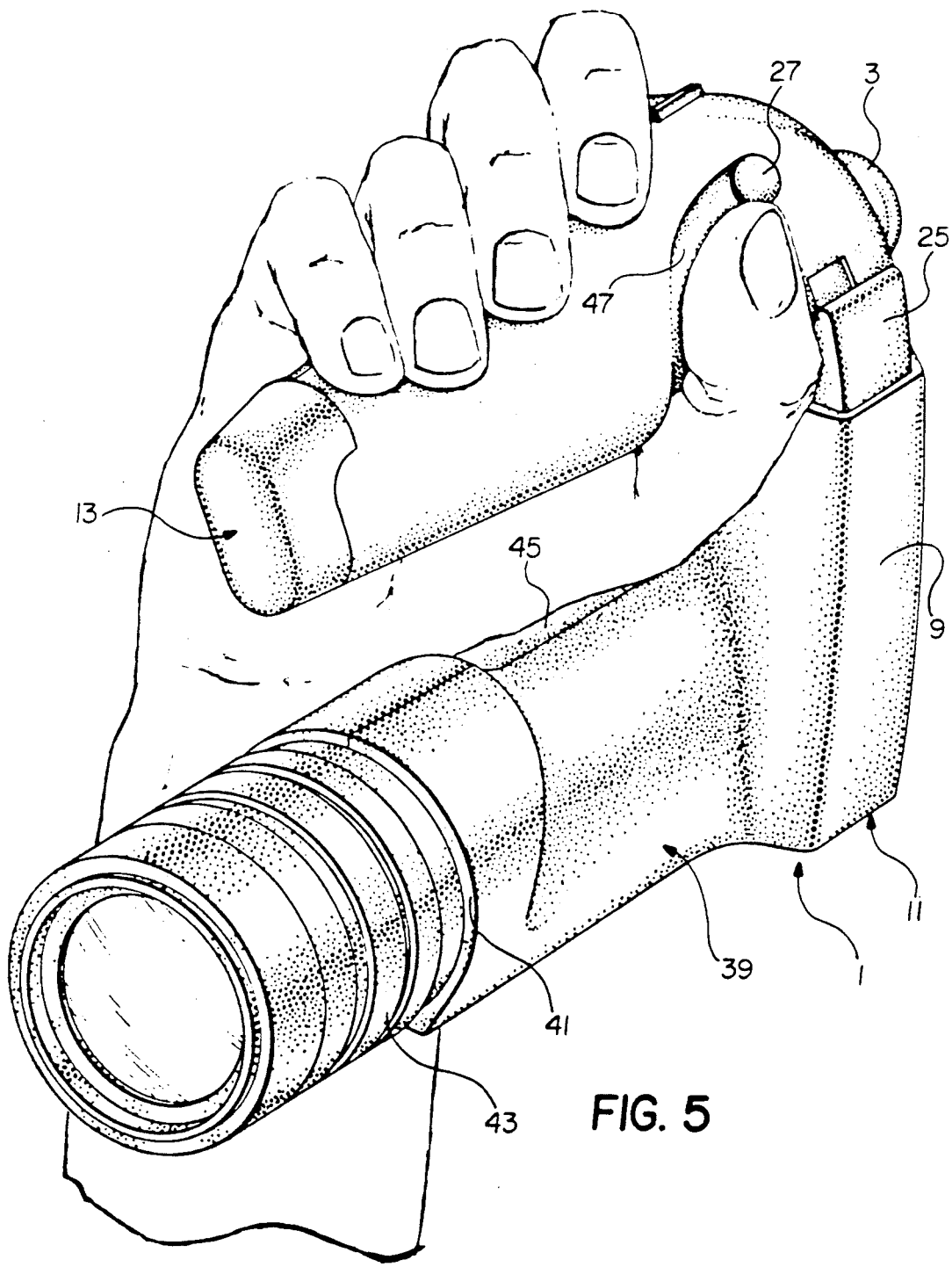
FIG. 5 is a front perspective view of the camera with its handle in the right-hand position, showing the manner by which one would hold the handle in that position.
Figure 6:
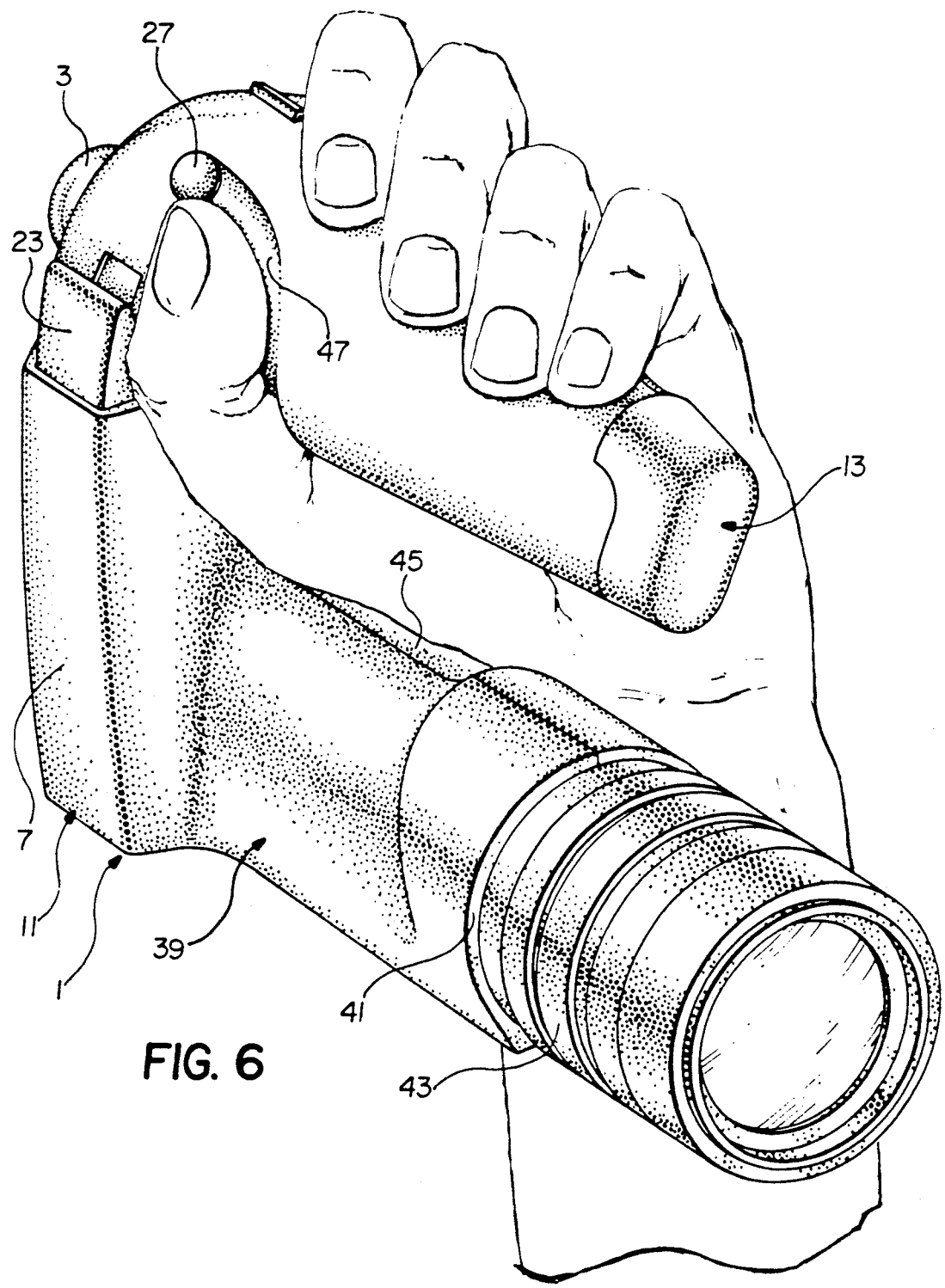
FIG. 6 is a front perspective view of the camera with its handle in the left-hand position, showing the manner by which one would hold the handle in that position.

The handle 13 as shown in FIG. 1 longitudinally extends substantially forward of the camera body 11. A hollow wrist or forearm rest 39 having a forward end portion 41 on which is mounted an objective lens 43 projects substantially forward of the camera body 11 midway between the opposite sides 7 and 9 of the camera body and parallel to the handle 13. The wrist rest 39 serves as an alternative right-hand/left-hand support for one's wrist when the handle 13 is in its right-hand position or its left-hand position. See FIGS. 5 and 6. A wrist recess 45 is provided in the wrist rest 39 for partly receiving one's right-hand or left-hand wrist, and a thumb recess 47 is provided in the handle 13 for partly receiving one's right-hand or left-hand thumb.

The invention has been described with reference to a preferred embodiment. However, it will be appreciated that modifications and variations can be effected within the ordinary skill in the art without departing from the scope of the invention.

We claim:

1. An improved photographic camera wherein a handle is used to manually hold the camera body steady, and wherein the improvement comprises:

mounting means connecting said handle and said camera body to permit the handle to be manually swung in opposite directions from a center position generally towards respective opposite sides of the camera body;

stop means for limiting movement of said handle in the opposite directions from its center position to right-hand and left-hand positions equally removed from the center position, to permit similar right-hand and left-hand use of the handle; and a wrist rest projecting substantially forward of said camera body substantially midway between said opposite sides of the camera body and substantially parallel to said handle, to serve as an alternative right-hand/left-hand support for one's wrist when the handle is in its right-hand position or its left-hand position.

2. An improved photographic camera wherein a viewfinder has a viewing axis extending from a rear finder window located between two opposite sides of a camera body, and a handle is provided for manually holding said camera body steady, and wherein the improvement comprises:

mounting means connecting said handle and said camera body to permit the handle to be manually swung about said viewing axis in opposite directions from a center position directly above the viewing axis generally towards said opposite sides of the camera body;

stop means for limiting movement of said handle in the opposite directions from its center position to right-hand and left-hand positions equally removed from the center position, to permit similar right-hand and left-hand use of the handle; and a wrist rest projecting substantially forward of said camera body substantially midway between said opposite sides of the camera body and substantially parallel to said handle, to serve as an alternative right-hand/left-hand support for one's wrist when the handle is in its right-hand position or its left-hand position.

3. The improvement as recited in claim 2, wherein said viewfinder window is arranged substantially midway between said opposite sides of the camera body.

4. The improvement as recited in claim 2 or 3, wherein said handle longitudinally extends substantially forward of said camera body.

5. The improvement as recited in claim 2, wherein said wrist rest has a forward end portion including an objective lens.

* * * * *

UNITED STATES PATENT AND TRADEMARK OFFICE
CERTIFICATE OF CORRECTION

PATENT NO. : 5,177,517
DATED : Jan. 5, 1993
INVENTOR(S) : J.J. Schappler and D.M. Gilford It is certified that error appears in the above-indentified patent and that said Letters Patent is hereby corrected as shown below:

Col. 1, Line 8, after "to" insert--an improved camera which has an alternative--.

Signed and Sealed this

Fourteenth Day of December, 1993

Attest:

BRUCE LEHMAN

*Attesting Officer*  *Commissioner of Patents and Trademarks*